July 27, 1965
J. D. SPERRY
3,197,645
LOOP SENSING APPARATUS
Filed Nov. 1, 1961
3 Sheets-Sheet 1
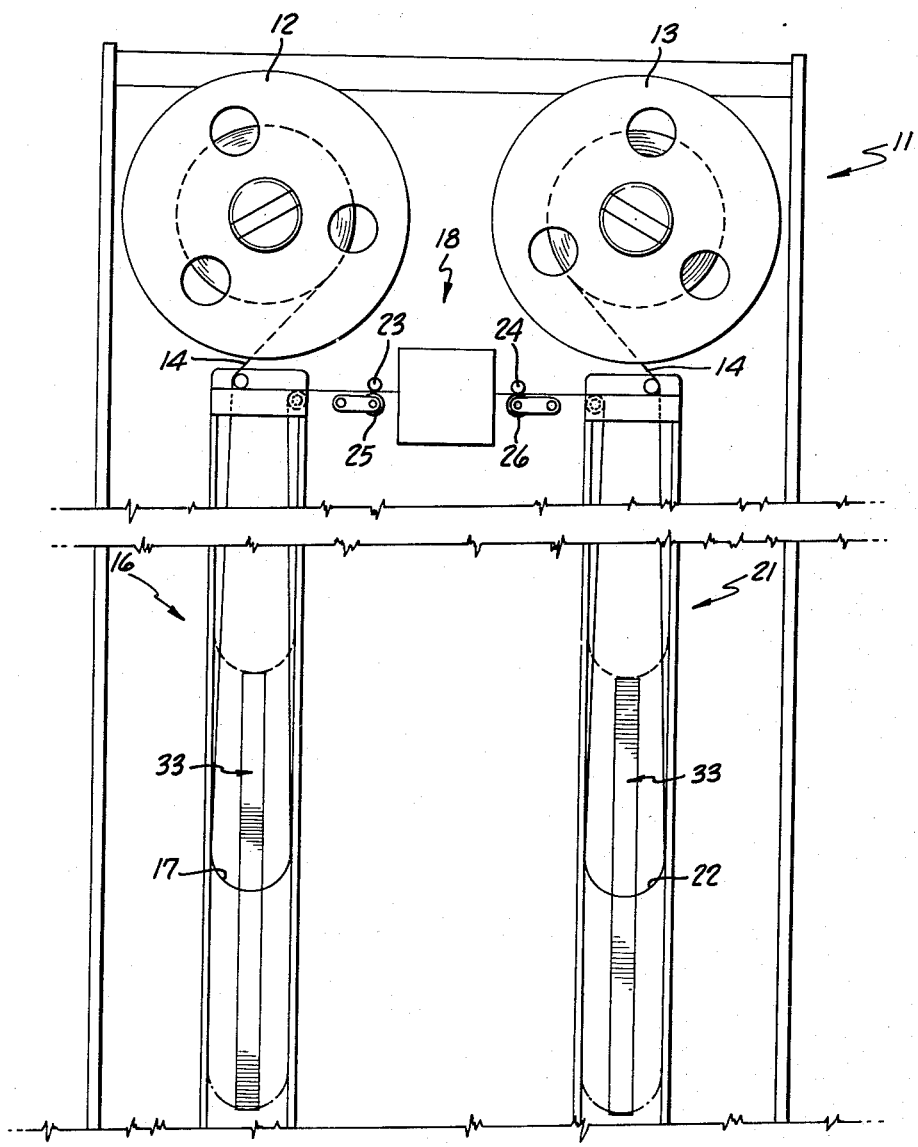
FIG_1
JOHN D. SPERRY
INVENTOR.
BY Robert S. Clay
ATTORNEY

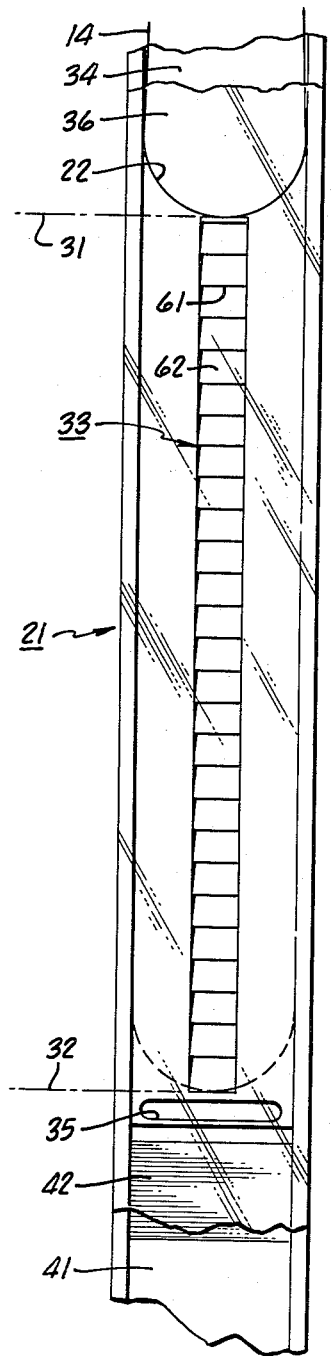
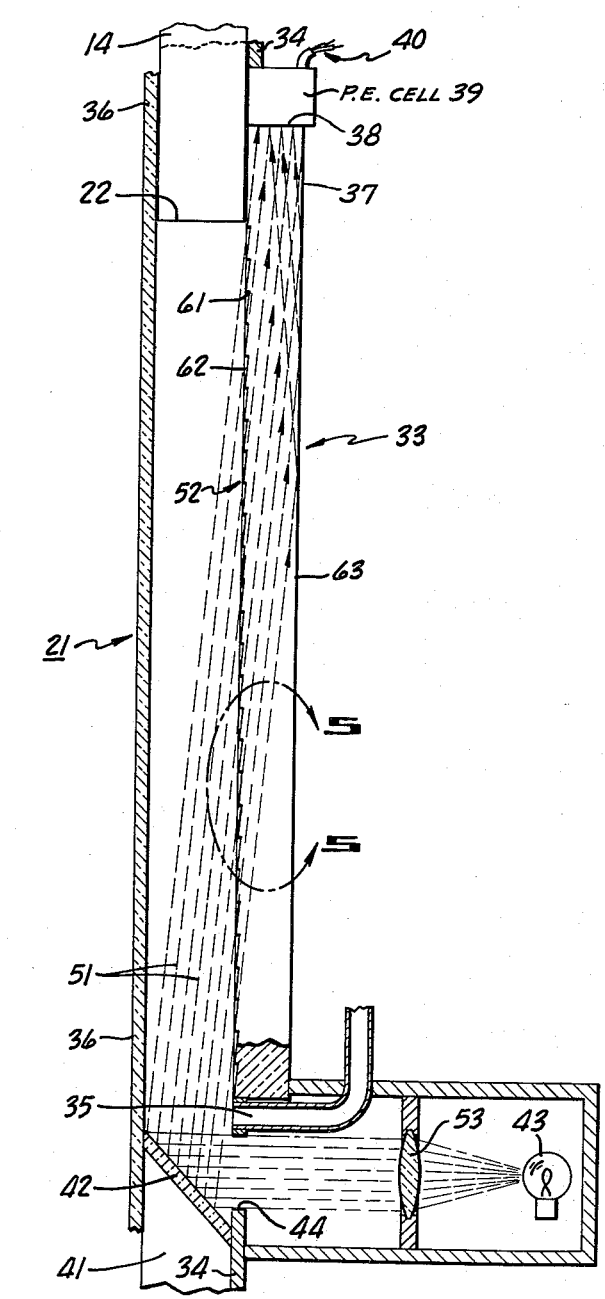

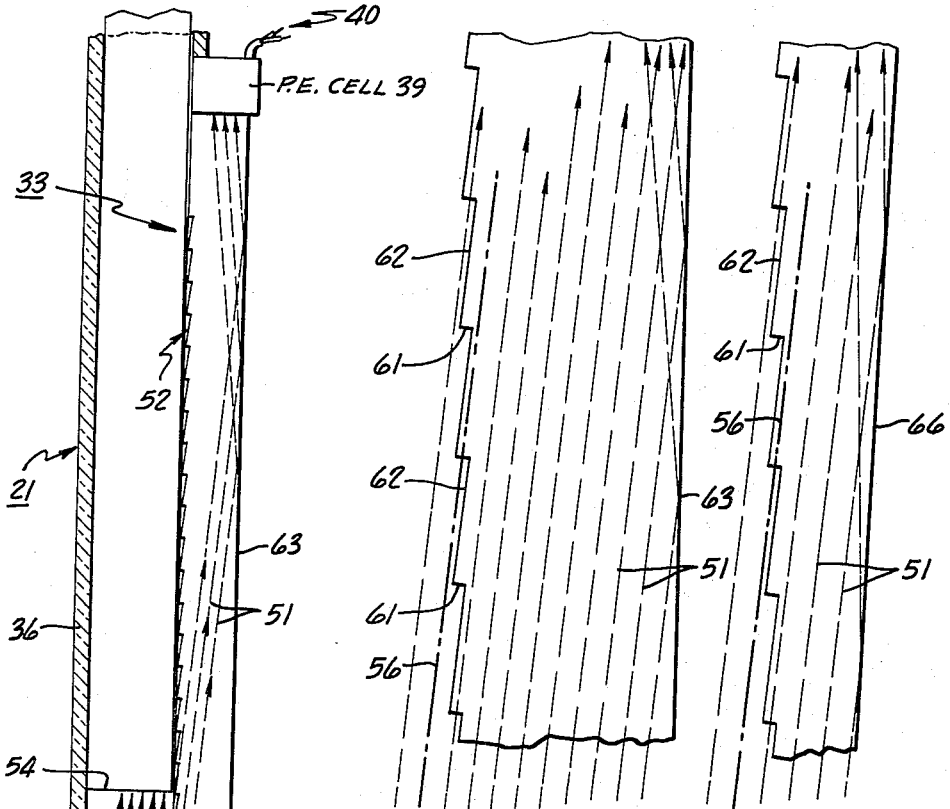
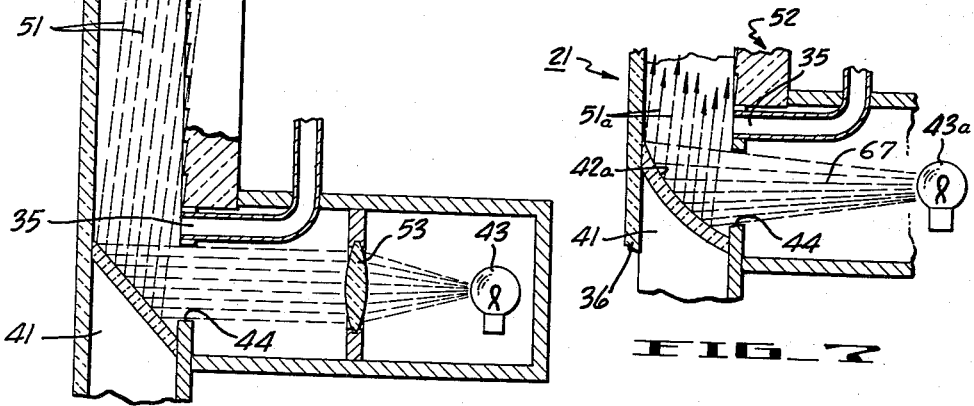

3,197,645
LOOP SENSING APPARATUS
John D. Sperry, Los Altos, Calif., assignor to Ampex Corporation, Redwood City, Calif., a corporation of California
Filed Nov. 1, 1961, Ser. No. 149,306
7 Claims. (Cl. 250—219)

This invention relates to tape loop storage columns, and particularly to apparatus for sensing the length of loop in such a column.

In the magnetic tape recording art, particularly as applied to tape transports for use with computing and data processing systems, it is customary to provide a tape loop storage column on either side of the magnetic head and capstan assembly so that during the very fast starting, stopping and reversing movement of the tape that is required in such systems, the segment of tape in the immediate vicinity of the magnetic heads can be isolated from the tape pack of the supply and takeup reels and can be more rapidly accelerated and decelerated by the capstan than can the tape on the more massive reels. In such operation, the tape is maintained in a loop in each of the columns so as to lengthen and shorten during supply and take up operations and provide a controlled slack to accommodate the differential accelerations of the tape. Usually the loops are held in tension by air pressure-differential means to achieve the necessary tension of the tape across the transducing heads.

One of the requirements in such a system is for means to instantaneously and continuously sense the actual lengths of the tape loops in the columns, so that control may be exercised over the rotational velocities and accelerations of the reels to counteract the changes in length of the loops, and as quickly as possible to restore the loops to balanced original lengths.

Heretofore in the art the sensing means have been of various types, including means for sensing differences in air pressure in the column that are brought about by lengthening or shortening of the loop; and also including various arrangements of light sources and photoelectric devices positioned at multitudinous points in the length of the tape column. Air pressure sensing means are not suitable for use with perforated tapes, or for other forms of tape because such means provide only a delayed signal that is not representative of the instantaneous length of loop at the instant the signal is given. The photoelectric sensing means previously known depend upon the placement of photocells in discrete locations along the column so that the sensing is directly representative only when the bend of the tape loop is precisely at these locations and is to some degree erroneous when the bend of the loop is between the photocells.

Accordingly, it is an object of the present invention to provide a tape loop sensing means suitable for use with either perforated or nonperforated tapes and giving a precisely accurate indication of the instantaneous loop length continuously and without delay.

It is another object of the present invention to provide a tape loop sensing means having no moving parts and operating independently of the inertia-hampered movement of air or other fluids entrapped within the system.

It is a further object of the invention to provide a tape loop sensing means giving a continuous signal that at any instant precisely represents the length of loop in the column.

Apparatus constructed in accordance with the present invention makes use of a radiant energy (light) transparent window pane mounted in the longitudinal wall of the tape storage column and extending between the excursion limits of the tape loop bend. At one end of the window is mounted radiation-receiving device such as a photocell arranged to receive and to respond to all of the light that enters the window from the interior of the column. At the other end of the column there is mounted a means for providing a beam of collimated radiant energy (light) directed generally along the length of the column but angled so as to impinge on the entire length of the window when the tape loop is not covering any part of the window. Thus when the tape loop is anywhere between its limits of excursion the zone of the collimated light source is at least partly masked from the photocell end of the window and a portion of the light is cut off, this portion being a function of the tape loop length. The window is formed with facets to minimize reflection of the light from the surface confronting the light; and the back side of the window is spaced and inclined so as to provide total reflection of the light entering the window toward the photocell.

Other objects and advantages will be explained in the following specification, considered together with the accompanying drawings, in which:

FIGURE 1 is a front elevation view of a tape transport including the structure of the invention;

FIGURE 2 is a perspective elevation view, to an enlarged scale and partly in section, of a portion of the structure shown in FIGURE 1;

FIGURE 3 is a cross-sectional side elevation view of the apparatus shown in FIGURE 2;

FIGURE 4 is a cross-sectional view similar to that of FIGURE 3 and showing the tape in a different position in the apparatus;

FIGURE 5 is an enlarged view of a portion of the apparatus enclosed within line 5—5 of FIGURE 3;

FIGURE 6 is a view taken substantially as was FIGURE 5, and showing an alternative arrangement of the apparatus of the invention; and FIGURE 7 is an enlarged cross-sectional view of a portion of the storage column shown in FIGURES 2–4 and illustrating a variational form of the structure of the invention.

Referring now to FIGURE 1, there is shown a typical tape transport of the type used with computers and data processing systems. On a frame 11 are mounted a pair of supply and takeup reels 12 and 13 on which is coiled a tape 14. For forward motion, the tape 14 is drawn from the supply reel 12 to a tape loop storage column 16 where it is disposed in a loop 17; and from the column 16 the tape is guided through a transducing head assembly 18 and to a second storage column 21 where it is disposed in a second loop 22. From the column 21, the tape is guided to the takeup reel 13. In reverse operation the reel 13 becomes the supply reel and the reel 12 becomes the takeup reel.

A pair of capstans 23 and 24 and associated pinch rollers 25 and 26 are provided for moving the tape in the segment between the storage columns and in contact with the transducing head assembly 18. In forward motion of the tape, the pinch roller 25 is disengaged, and although the capstan 23 is rotating (in a clockwise direction) it has no effect in moving the tape; rather the tape is moved by the capstan 24 (rotating in a counter-clockwise direction), the pinch roller 26 being actuated to clamp the tape to the rotating surface on the capstan. In reverse play, the roller 26 is withdrawn and the roller 25 is engaged. For rapid starting, stopping and reversal of the tape, the capstans and pinch rollers are appropriately engaged and disengaged so as to very rapidly accelerate and decelerate the extremely short and low-mass segment of tape between the storage columns.

It is clear that this low-mass segment of tape can be much more quickly accelerated and decelerated by the capstans than can the very heavy reels 12–13 as by means of their operating motors, not here shown. When accordingly for example the tape is first started in forward motion the tape loop 17 is constrained to grow shorter in the column 16 and the loop 22 is constrained to grow longer. Eventually as the reels 12 and 13 are accelerated they reach an over-speed and re-establish the correct equal lengths of the loops 17 and 22, and the reel motors are controlled to re-establish the reels at the correct operating speeds to maintain the loops of equal length. A similar lengthening and shortening of the loops and re-establishment of their correct lengths takes place when the tape is stopped and when it is accelerated again as for example in reverse motion.

Control of the rotational motion of reels 12–13 to maintain the loops at their correct lengths is provided, as well known in the art, by some form of tape loop length sensing means. In the present invention, the sensing means is arranged as follows.

Referring now to FIGURES 2 and 3, the tape storage column 21 is shown with the loop 22 at the upper limit 31 of its normal excursion; the lower limit being indicated by the dashed line 32. As part of the sensing means of the invention, a light transparent window pane 33 is mounted in a longitudinal (back) wall 34 of the column 21, above the suction outlet 35 of the column. The front wall 36 of the column is normally made of transparent material so that the action of the loops can be observed by the transport operator. The pane 33 is mounted to be substantially flush with the inner surface of the wall 34, and the pane has a width that is less than the width of the wall 34 and of the tape loop 22, so that the tape loop is guided in movement on the portions of wall 34 that flank the pane, and is prevented from catching on surface facets (later described) of the pane. The pane also has a substantial thickness so that it extends outwardly of the wall and column to present an upper end 37 with a face 38. Against the face 38 is mounted the light receiving end of a photocell 39 so that the photocell receives and electrically responds to light that is transmitted to it through the length of the pane 33. A signal representing this amount of light is transmitted through leads 40 to means old in the art and not here shown, for regulating the operation of the reel motors.

To provide light to the photocell through the pane 33, there is mounted in the lower end 41 of the column 21 a mirror 42; and exteriorly of the column there is mounted a light source 43 that transmits light to the mirror 42 through an opening 44 provided in the wall 34 of the column. It will be seen that the mirror 42 is inclined so as to reflect the light in a beam that impinges on the entire length of the pane 33 between the limits the limits of excursion 31–32 of the tape loop when the tape loop is not between its limits of excursion. In other words, the amount of light that is received by the photocell 39 is dependent upon the position of the tape loop, which masks a portion of the window, including the end 37, whenever the loop is between its limits of excursion.

As an important feature of the invention the light beam 51 that is directed at the pane 33 if formed of collimated light; or in other words of light rays that proceed everywhere parallel to one another. Thus there is no dispersion or convergence of the light between the mirror 42 and the light-receiving face 52 of the pane 33; and the intensity of the light falling upon the pane 33 is everywhere the same with the result that the amount of light received by the photocell is a linear and directly proportional function of the position of the tape loop.

Because light sources are usually substantially point sources of light, the structure of the invention provides means for collimating the light emanating from source 43. As here shown this means includes a converging lens 53 mounted between the source 43 and the mirror 42. The lens 53 receives diverging light from the source 43 and converges it so that in passage between the lens 53 and the mirror 42 the light is collimated or formed of parallel rays. As here shown and with this lens 53, the mirror 42 is of planar form and has a flat surface so that the reflected beam 51 is also formed of collimated light.

Referring now to FIGURE 4, the action of the apparatus when the tape loop 22 is between its limits of excursion 31–32 is illustrated. It is clear that a proportion of the light in beam 51 is masked by the lower bend 54 of the loop, and that the amount of light that is cut off is directly proportional to the length of the loop included between the limits 31–32 of excursion.

Referring now to FIGURE 5, some of the structural details of the pane 33 are illustrated in enlarged form. It will be understood that the light in the beam 51 is directed parallel to an axis 56 that is very nearly parallel to the length of the tape storage column, but not exactly. The angle of inclination of the light to the length of the column is such that the light is incident on the wall 34 at a very high angle, and in fact at such a high angle that there would be very high reflection of the light from the wall 34. In order that the pane 33 will not produce such high reflection, the interior face 52 of the window is provided with a plurality of facets 61 and 62. The facets 61 are of planar form and all lie in planes parallel to one another and perpendicular to the axis 56. Thus the light entering through the facets 61 has the least possible reflection from the pane and the greatest possible penetration to the interior of the pane. The facets 62 are all in planes parallel to one another and parallel to the axis 56, so that these facets receive substantially none of the incident light, but are nevertheless inclined to be of maximum effect in re-reflecting incident light coming from the interior of the pane 33 and directing such light toward the photocell 39. As will be seen in the figure, the back face 63 of the window 33 is inclined to the axis 56 at such an angle that the light entering the facets 61 and impinging on the interior facing 63 is totally reflected therefrom and kept within the pane. In other words the face 63 is inclined to the axis 56 so that the angle of incidence of the light on face 63 is greater than the critical angle of total reflection characteristic of the combination of material of which the pane is made and the material of the exterior atmosphere (air). (The critical angle and the angle of incidence are both measured from a line normal to the reflecting surface at the point of incidence.) It will be understood however that if light were reflected from the face 63 and subsequently impinged one of the facets 62, such light would have a smaller angle of incidence on the facet 62 than it originally had on the pane 63. Therefore, in one embodiment of the invention, the face 63 is spaced sufficiently far from the face 52 that the light that is reflected from the face 63 subsequently does not encounter any of the facets 62, but is reflected directly to the upper face 38 of the window and to the photocell 63. Alternatively, the wall 63 may be inclined at such an angle that even if light reflected from the face 63 does subsequently encounter one or more of the facets 62, the subsequent angles of incidence are all greater than the critical angle of total reflection. It will be clear of course that the light must arrive at the face 38 at an angle of incidence that is substantially smaller than the critical angle, so that the greatest possible amount of transmitted light will pass to the photocell and will not be reflected back into the pane at this point.

Alternatively again the wall 63 of the pane 33 may be formed as a curved or inclined surface 66 as illustrated in FIGURE 6 so that the interiorly reflected light is all focused convergingly and directly on the face of the photocell 39. Such an arrangement permits a closer spacing between the front and back walls of the window pane.

An alternative arrangement for providing the collimated light required is illustrated in FIGURE 7. In this figure a point source of light 43a is provided, but no lens 53. In place of the lens, a curved mirror 42a is arranged to receive the diverging light 67 from the source 43a and to reflect this light in a collimated beam 51a, all of the rays of which are parallel to one another.

It will be understood that radiant energy other than light may be used in this invention so long as a proper radiation source and reeciving device are provided, and the radiation is collimated; and that even un-collimated (e.g., point-source) radiation can be used, providing an indication that is a non-linear but regular function of the tape loop length, so long as the reel motor control apparatus is arranged to function satisfactorily in receipt of such an indication.

Thus there has been described an apparatus for sensing the length of a tape loop in a storage column, the apparatus including a means providing collimated radiant energy (light) directed at one interior wall of the column from a zone that is perpetually masked from one limit of excursion of the tape loop when the tape loop is between its limits of excursion; the light being received by a window pane mounted in the wall of the column between the limits of excursion of the loop; and a radiation-sensitive device (photocell) mounted at one end of the window for receiving all of the light that falls upon the window and for providing a signal indicative of the length of the loop in the column.

What is claimed is:

1. In a tape transport, apparatus for sensing the length of the loop in a tape storage column, comprising:
    (a) means for providing a beam of collimated light from a zone on the interior of said column and at one end thereof, with said beam being directed along a first axis inclined to a first longitudinal wall of said column and incident on said wall between the limits of excursion of said tape loop when said tape loop is at the more remote limit of excursion thereof;
    (b) a transparent pane mounted in said first longitudinal wall of said column and extending between the said limits of excursion of said tape loop; and
    (c) a light-sensitive photocell mounted at one end of said pane corresponding to said one end of said column for receiving said light and for providing a signal corresponding to the amount of said light received.

2. In a tape transport, apparatus for sensing the length of the loop in a tape storage column, comprising:
    (a) means for providing a beam of collimated light from a zone on the interior of said column and at one end thereof, with said beam being directed along a first axis inclined to a first longitudinal wall of said column and incident on said wall between the limits of excursion of said tape loop when said tape loop is at the more remote limit of excursion thereof;
    (b) a transparent pane mounted in said first longitudinal wall of said column and extending between the said limits of excursion of said tape loop;
    (c) the side of said pane remote from said tape loop being inclined to said axis such that said light that enters said pane is reflected from said remote side and is directed to a first end of said pane corresponding with said remote limit of excursion of said tape loop; and
    (d) a light-sensitive photocell mounted at said first end of said pane for receiving said light and for providing a signal corresponding to the amount of said light reecived.

3. In a tape transport, apparatus for sensing the length of the loop in a tape storage column, comprising:
    (a) means for providing a beam of collimated light from a zone on the interior of said column and at one end thereof, with said beam being directed along a first axis inclined to a first longitudinal wall of said column and incident on said wall between the limits of excursion of said tape loop when said tape loop is at the more remote limit of excursion thereof;
    (b) a transparent pane mounted in said first longitudinal wall of said column and extending between said limits of excursion of said tape loop,
    (c) said pane being provided on the inner side thereof with a plurality of facets alternately perpendicular to and parallel to said axis,
    (d) said pane having a width less than the width of the adjacent portion of said tape loop, and
    (e) the side of said pane opposite said facets being spaced from said facets and inclined to said axis so that the light that enters said pane is totally reflected from said opposite side and is directed to a first end of said pane corresponding with said more remote limit of excursion of said tape loop; and
    (f) a light-sensitive photocell mounted at said first end of said pane for receiving said reflected light and for providing a signal corresponding to the amount of said light reecived.

4. In a tape transport, apparatus for sensing the length of the loop in a tape storage column, comprising:
    (a) means for providing a beam of collimated light from a zone on the interior of said colmun and at one end thereof, with said beam being directed along a first axis inclined to a first longitudinal wall of said column and incident on said wall between the limits of excursion of said tape loop when said tape loop is at the more remote limit of excursion thereof;
    (b) said means including a mirror mounted in said one end of said column within said zone and inclined to reflect light along said first axis when said light is incident on said mirror on a second axis, and
    (c) said means also including a light source mounted on said second axis in view of said mirror;
    (d) a transparent pane mounted in said first longitudinal wall of said column and extending between said limits of excursion of said tape loop,
    (e) said pane being provided on the inner side thereof with a plurality of facets alternately perpendicular to and parallel to said first axis,
    (f) said pane having a width less than the width of the adjacent portion of said tape loop, and
    (g) the side of said pane opposite said facets being spaced from said facets and inclined to said first axis so that the light that enters said pane is totally reflected from said opposite side and is directed to a first end of said pane corresponding with said remote limit of excursion of said tape loop; and
    (h) a light-sensitive photocell mounted at said first end of said pane for receiving said reflected light and for providing a signal corresponding to the amount of said light received.

5. Sensing apparatus as characterized in claim 3, wherein the inclination and spacing of said opposite side is such that the subsequent incidence of said reflected light on any of said parallel facets and on other portions of said opposite side is also at an angle greater than said critical angle, said light arriving at said photocell at an angle less than said critical angle.

6. Apparatus as in claim 4, wherein said light providing means includes a point source of light and a converging lens mounted to receive light from said source and to pass said light as a collimated beam along said second axis to said mirror.

7. Apparatus as in claim 4, wherein said light providing means includes a point source of light spaced on said second axis from said mirror, and said mirror is concave such that said light is reflected therefrom along said first axis as a collimated beam.

References Cited by the Examiner

UNITED STATES PATENTS

| | | | |
|---|---|---|---|
| 1,747,936 | 2/30 | Heuroteaus | 250—219 X |
| 2,379,132 | 6/35 | Cook | 250—219 |
| 2,897,370 | 7/59 | Sauter | 250—219 |
| 2,945,958 | 7/60 | Morris | 88—1 |
| 2,990,469 | 6/61 | Benard | 88—1 |
| 3,068,697 | 12/62 | Carlson | 88—1 |

FOREIGN PATENTS

| | | |
|---|---|---|
| 231,268 | 11/59 | Australia. |
| 607,449 | 10/60 | Canada. |

RALPH G. NILSON, *Primary Examiner.*

WALTER STOLWEIN, *Examiner.*